US012162214B2

(12) United States Patent
Geissler et al.

(10) Patent No.: US 12,162,214 B2
(45) Date of Patent: Dec. 10, 2024

(54) LASER MACHINE TOOL WITH TRANSPORTING DEVICE

(71) Applicant: DMG MORI ADDITIVE GMBH, Bielefeld (DE)

(72) Inventors: Alfred Geissler, Pfronten (DE); Karl Lechleiter, Oy-Mittelberg (DE)

(73) Assignee: DMG MORI ADDITIVE GMBH, Bielefeld (DE)

( * ) Notice: Subject to any disclaimer, the term of this patent is extended or adjusted under 35 U.S.C. 154(b) by 0 days.

(21) Appl. No.: 17/049,370

(22) PCT Filed: May 3, 2019

(86) PCT No.: PCT/EP2019/061461
§ 371 (c)(1),
(2) Date: Oct. 21, 2020

(87) PCT Pub. No.: WO2019/211476
PCT Pub. Date: Nov. 7, 2019

(65) Prior Publication Data
US 2021/0331251 A1   Oct. 28, 2021

(30) Foreign Application Priority Data

May 3, 2018  (DE) .......................... 102018206825.9
May 30, 2018 (DE) .......................... 102018208652.4

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 10/32* (2021.01); *B22F 10/68* (2021.01);
(Continued)

(58) Field of Classification Search
CPC ........ B22F 12/226; B22F 10/20; B22F 10/28; B22F 10/73; B22F 12/22; B22F 12/38;
(Continued)

(56) References Cited

U.S. PATENT DOCUMENTS 6,972,115 B1 * 12/2005 Ballard ..................... B22F 9/14
422/186.04
2015/0042018 A1   2/2015 Gunther et al.
(Continued)

FOREIGN PATENT DOCUMENTS

CN   107427922 A   12/2017
DE   199 05 067 A1   8/2000
(Continued)

OTHER PUBLICATIONS

Espacenet machine translation of DE102015005780A1 to Herzog et al., originally published 2016 (Year: 2016).*
(Continued)

*Primary Examiner* — Seyed Masoud Malekzadeh
*Assistant Examiner* — Jennifer L Groux
(74) *Attorney, Agent, or Firm* — Oliff PLC (57) ABSTRACT

A machine for manufacturing shaped objects layer by layer by locationally selectively fusing material powder to form connected regions by means of electromagnetic radiation or particle radiation. The machine includes a process chamber, which surrounds a process space, an unpacking chamber, which surrounds an unpacking space, a first building cylinder and a second building cylinder, which each have a workpiece table for material powder and a building space, wherein the workpiece tables can each be moved into the building space, and a transporting device for transferring the building cylinders between an operating position in the process space and an unpacking position in the unpacking space. According to the invention, the transporting device is
(Continued)

configured to transfer the first building cylinder from the operating position into the unpacking position and the second building cylinder from the unpacking position into the operating position simultaneously.

10 Claims, 5 Drawing Sheets

(51) Int. Cl.

| | |
|---|---|
| *B22F 10/32* | (2021.01) |
| *B22F 10/68* | (2021.01) |
| *B22F 10/73* | (2021.01) |
| *B22F 12/00* | (2021.01) |
| *B22F 12/30* | (2021.01) |
| *B22F 12/70* | (2021.01) |
| *B22F 12/84* | (2021.01) |
| *B28B 1/00* | (2006.01) |
| *B29C 64/227* | (2017.01) |
| *B29C 64/25* | (2017.01) |
| *B29C 64/357* | (2017.01) |
| *B29C 64/371* | (2017.01) |
| *B33Y 10/00* | (2015.01) |
| *B33Y 30/00* | (2015.01) |
| *B33Y 40/20* | (2020.01) |
| *B22F 12/88* | (2021.01) |
| *B23K 26/342* | (2014.01) |

(52) U.S. Cl.
CPC .............. *B22F 10/73* (2021.01); *B22F 12/22* (2021.01); *B22F 12/226* (2021.01); *B22F 12/30* (2021.01); *B22F 12/38* (2021.01); *B22F 12/70* (2021.01); *B22F 12/84* (2021.01); *B28B 1/001* (2013.01); *B29C 64/227* (2017.08); *B29C 64/25* (2017.08); *B29C 64/357* (2017.08); *B29C 64/371* (2017.08); *B33Y 10/00* (2014.12); *B33Y 30/00* (2014.12); *B33Y 40/20* (2020.01); *B22F 12/224* (2021.01); *B22F 12/88* (2021.01); *B23K 26/342* (2015.10)

(58) Field of Classification Search
CPC ..... B22F 12/70; B29C 64/241; B29C 64/379; B29C 64/153; B29C 64/165; B29C 64/25; B29C 64/227; B29C 64/357; B29C 64/371; B23K 3/047; B33Y 30/00; B33Y 10/00; B33Y 40/20

See application file for complete search history.

(56) References Cited

U.S. PATENT DOCUMENTS

| | | | | |
|---|---|---|---|---|
| 2016/0243618 | A1* | 8/2016 | Heugel | B22F 10/28 |
| 2017/0028472 | A1* | 2/2017 | Shaw | B22F 10/73 |
| 2017/0136543 | A1* | 5/2017 | Hermann | B22F 10/68 |
| 2017/0197367 | A1 | 7/2017 | Gunther et al. | |
| 2018/0001557 | A1* | 1/2018 | Buller | B22F 12/90 |
| 2018/0099332 | A1* | 4/2018 | Shaw | B33Y 10/00 |
| 2018/0133966 | A1* | 5/2018 | Plachner | B22F 12/82 |
| 2018/0326711 | A1 | 11/2018 | Herzog | |
| 2019/0126347 | A1 | 5/2019 | Roman et al. | |
| 2019/0143406 | A1* | 5/2019 | Carter | B33Y 30/00 264/109 |

FOREIGN PATENT DOCUMENTS

| | | | | |
|---|---|---|---|---|
| DE | 10 2011 112 581 A1 | 3/2013 | | |
| DE | 102012002955 A1 * | 8/2013 | | B25J 21/02 |
| DE | 10 2012 004 213 A1 | 9/2013 | | |
| DE | 102012009071 A1 * | 11/2013 | | B29C 64/153 |
| DE | 20 2013 009 787 U1 | 12/2013 | | |
| DE | 10 2013 223 411 A1 | 5/2015 | | |
| DE | 102015005780 A1 * | 12/2016 | | B22F 10/20 |
| DE | 10 2015 119 698 A1 | 5/2017 | | |
| DE | 10 2017 002 448 A1 | 11/2017 | | |
| DE | 10 2016 211 800 A1 | 1/2018 | | |
| EP | 3275655 A1 * | 1/2018 | | B22F 10/20 |
| GB | 2543305 A * | 4/2017 | | B33Y 30/00 |
| JP | S61-293603 A | 12/1986 | | |
| WO | 98/24574 A1 | 6/1998 | | |
| WO | WO-2008128502 A2 * | 10/2008 | | B22F 3/1055 |
| WO | 2017/208234 A1 | 12/2017 | | |
| WO | 2018/022002 A1 | 2/2018 | | |

OTHER PUBLICATIONS

Espacenet translation of Herzog '071 (originally published 2013) (Year: 2013).*
Espacenet translation of EP 3275655 A1, Herzog '655 (Year: 2018).*
Jun. 26, 2019 International Search Report issued in International Patent Application No. PCT/EP2019/061461.
Jan. 25, 2022 Office Action issued in Canadian Patent Application No. 3099270.
Jan. 25, 2022 Office Action issued in Japanese Patent Application No. 2020-561829.
Jun. 10, 2022 Office Action issued in Indian Patent Application No. 202037047866.
May 16, 2022 Office Action issued in Chinese Patent Application No. 201980030070.2.
Dec. 1, 2022 Office Action issued in Chinese Patent Application No. 201980030070.2.
Apr. 13, 2023 Office Action issued in Canadian Patent Application No. 3,099,270.
Sep. 21, 2023 Extended Search Report issued in European Patent Application No. 19722111.2.

* cited by examiner

LASER MACHINE TOOL WITH TRANSPORTING DEVICE

The present invention relates to a machine and a method for manufacturing shaped bodies layer by layer by spatially-selectively consolidating material powder to form contiguous regions by means of electromagnetic radiation or particle radiation, in particular by means of focused laser radiation.

A machine of the generic kind is, in particular, a machine for manufacturing shaped bodies according to the principle of selective laser melting or selective laser sintering. In particular, material powders made of a metal, a metal alloy, a plastic or a ceramic material may be used and processed. To summarize the different types of machines for machining/manufacturing/producing a workpiece or a shaped body with laser radiation, the term laser machine tool or simply machine is used in the following.

By means of the method of selective laser melting or laser sintering, shaped bodies, such as machine parts, tools, prostheses, pieces of jewelry, etc., may be manufactured in accordance with the geometrical description data of the corresponding shaped bodies by building up layer by layer from a metallic or ceramic material powder or from a plastic powder. During the manufacturing process, the material powder to be fused is applied layer by layer to a workpiece table and, depending on the geometric description data, exposed to electromagnetic radiation or particle radiation, in particular focused laser radiation. The radiation causes heating and consequently a fusion or sintering of the material powder of a powder layer such that certain regions of the powder layer are consolidated. The consolidated regions correspond to the cross-section of the shaped body to be manufactured of the applied material powder layer. After the cross-section of the shaped body has been consolidated in a material layer, the workpiece table is lowered by a layer thickness and a new material powder layer is applied. Again, a cross section of the shaped body may now be consolidated. This process is repeated until the shaped body has been built up completely layer by layer. A more precise description of the operating principle of laser melting or laser sintering can be found in WO 98/24574 A1 or DE 199 05 067 A1, for example.

The space in which the workpiece table is located with the material powder layers applied thereto is called the building space. The workpiece table forms the floor of the building space. The building space or the workpiece table usually has a cylindrical shape with a round or rectangular cross section. The maximum distance by which the workpiece table can be lowered into the building cylinder perpendicularly to the cross section of the shaped body to be manufactured determines the maximum height of the shaped body.

After completing a manufacturing process of a shaped body from a plurality of layers of material powder, the shaped body must be unpacked. Here, the non-consolidated material powder is separated from the shaped body and removed from the building space. When removing the non-consolidated material powder, preferably no material powder should leave the machine. In addition, the material powder may consist of a valuable material, so that as much as possible of the non-consolidated material powder should be reused. A machine of the generic kind therefore comprises a device for recycling the non-consolidated material powder.

With many machines, the unpacking process is carried out in the process space itself. For this purpose, the process space is surrounded by a process chamber with access openings in which gloves are attached for reaching into the process space in a sealed manner, so that an operator of the machine can use the gloves to reach into the process space without material powder being able to get outside or without contamination being able to get into the process room from outside. However, the unpacking process can take many hours of work, so that the machine cannot be used to manufacture another shaped body during this time.

The utility model DE 20 2013 009 787 U1 discloses a system for laser melting with a workpiece manufacturing section for manufacturing workpieces and a post-treatment section. In a process chamber of the workpiece manufacturing section, a workpiece table (carrier) which can be moved into a building chamber is arranged. The building chamber may be removed from the workpiece manufacturing section and transferred to the post-treatment section. The post-treatment section comprises a plurality of stations between which the building chamber can be transported by means of a transporting device.

The present invention is based on the object of providing an improved machine and an improved method for manufacturing shaped bodies layer-by-layer by spatially-selectively consolidating material powder to form contiguous regions by means of electromagnetic radiation or particle radiation. In particular, a machine which allows an unpacking process to be carried out simultaneously with a manufacturing process is to be provided.

The object is achieved by a machine for manufacturing shaped bodies layer by layer by spatially-selectively consolidating material powder to form contiguous regions by means of electromagnetic radiation or particle radiation according to claim 1. According to the invention, the machine comprises a transporting device configured to transfer a first building cylinder from an operating position to an unpacking position and a second building cylinder from the unpacking position to the operating position.

The machine comprises a process chamber enclosing a process space and an unpacking chamber enclosing an unpacking space. Furthermore, the machine comprises a first building cylinder and a second building cylinder, each of which has a workpiece table for material powder and a building space, the workpiece tables each being displaceable into the building space. In addition, the machine comprises a transporting device for transferring the building cylinders between an operating position in the process space and an unpacking position in the unpacking space.

The object according to the invention is also achieved by a method for manufacturing a shaped body comprising the steps of: connecting a building space of a first building cylinder to a process space, applying a material powder layer to a workpiece table arranged in the first building space; spatially-selectively consolidating regions of the material powder layer by means of electromagnetic radiation or particle radiation; lowering the workpiece table by the thickness of a material powder layer into the first building space; repeating the steps of applying, consolidating and lowering until the shaped body is completed; performing a translational movement to remove the first building cylinder from the process space; performing a rotational movement of the first building cylinder about an axis of rotation parallel to an axis of symmetry of the first building cylinder; performing a translational movement to connect the first building space to an unpacking space; removing and recycling the non-consolidated material powder (P); and removing the finished shaped body (W) from the first building cylinder. According to the invention, while the first building cylinder is being transferred from the process room to the unpacking room, concurrently a second building cylinder with a second building room is being transferred from the unpacking room to the process room so that a further manufacturing process can be carried out in the second building cylinder while the shaped body is being unpacked from the first building cylinder.

Advantageous embodiments and further developments which may be used individually or in combination with one another are the subject matter of the dependent claims.

The first building cylinder and the second building cylinder are preferably arranged on a carrier of the transporting device. The carrier may, for example, be configured as a rotatable plate or as a rotatable body. In particular, the carrier has an axis of rotation which is oriented in parallel to an axis of symmetry of the first building cylinder or the second building cylinder. By rotating the carrier, the first building cylinder and the second building cylinder may thus be simultaneously transferred between the operating position and the unpacking position. The common arrangement of the building cylinders on the carrier thus enables a technically particularly simple and efficient solution for the simultaneous transfer of the building cylinders.

The axis of rotation is preferably arranged in the center of the carrier and the building cylinders are arranged equidistantly from the axis of rotation so that the axis of rotation is arranged substantially at the center of mass of the carrier, so that an imbalance can be avoided.

The carrier of the transporting device may, in particular, be displaceable in parallel to the axis of rotation. The building cylinders arranged on the carrier can thus be displaced along the axis of rotation concurrently, t in particular raised or lowered. This allows for a gas-tight connection of the building spaces of the building cylinders to the process space or unpacking space since the translational movement can result in a displacement of the building cylinder towards a sealed receiving position in a base of the process chamber or unpacking chamber. In order to transfer the building cylinders, a translation of the carrier in the opposite direction away from the receptacle must first be carried out. Together with the preferred rotational movement, the transfer of the building cylinders between the operating position and the unpacking position may be performed as a combination of the lowering, rotating and raising movements of the carrier, so that the transfer of the building cylinders between the operating position and the unpacking position may be performed using a technically simple but efficient movement pattern. The process chamber and the unpacking chamber can be closable substantially gas-tightly. There, the term "substantially" means that the process chamber and unpacking chamber are sealed in such a way that a diffusion rate of a protective gas is significantly lower than a supply rate of protective gas common in the art. In addition, the building space of the first building cylinder and the building space of the second building cylinder in the operating position or unpacking position may each be connected substantially gas-tightly to the process chamber. For this purpose, the machine has, in particular, suitable sealing means for allowing a gas-tight connection of the building spaces with the process chamber or with the unpacking chamber.

The building space of the first building cylinder, the building space of the second building cylinder, the process space and the unpacking space are each closed substantially gas-tightly when the building cylinder is transferred between the operating position and the unpacking position. This means, in particular, that when the building cylinders are transferred between the operating position and the unpacking position, no gas exchange with the outside air or protective gas loss to the outside air takes place.

The process chamber and/or the unpacking chamber preferably have means for creating a protective gas atmosphere. These means may comprise gas supply lines, for example. By creating a protective gas atmosphere, undesired reactions of the material powder or of the shaped body with atmospheric oxygen or other air components can be prevented. A reaction with atmospheric oxygen may be disadvantageous, particularly during laser melting or laser sintering. Such undesired reactions can be avoided by building up a protective gas atmosphere, for example from pure nitrogen or argon or another suitable inert gas.

The process chamber and/or the unpacking chamber can each include means for creating an overpressure or an underpressure. The terms overpressure and underpressure are understood in relation to normal atmospheric pressure in the vicinity of the machine. The creation of an overpressure in the process chamber or unpacking chamber may prevent undesired contamination from the ambient air from entering. If, for example, the process chamber or the unpacking chamber is opened, it should be avoided that dust or other particles enter into the process chamber or the unpacking chamber. On the other hand, an underpressure may be created in the process chamber and/or the unpacking chamber. This may advantageously be used to ensure that particles, for example harmful welding smoke or material powder, leak from the process space or the unpacking space of the machine to the outside.

Preferably, the unpacking chamber includes means for recovering and/or recycling non-consolidated material powder. These means may comprise a suction device for non-consolidated material powder, by means of which the non-consolidated material powder can be sucked off when the shaped body is unpacked. The non-consolidated material powder can then be reused. For this, it may be necessary to first recycle the material powder, for example by performing a process of filtering and/or sieving and/or cleaning the material powder.

BRIEF DESCRIPTION OF THE FIGURES

Further advantageous embodiments are described in more detail below with reference to an exemplary embodiment shown in the drawings, to which the invention is not limited. In the figures:

FIG. 2b shows a sectional view through the axis of rotation of the transporting device shown in FIG. 2a perpendicular to the section in FIG. 2a.

DETAILED DESCRIPTION OF THE INVENTION BASED ON AN EXEMPLARY EMBODIMENT

In the following description of a preferred embodiment of the present invention, the same reference symbols denote the same or comparable components.

Figure 1:
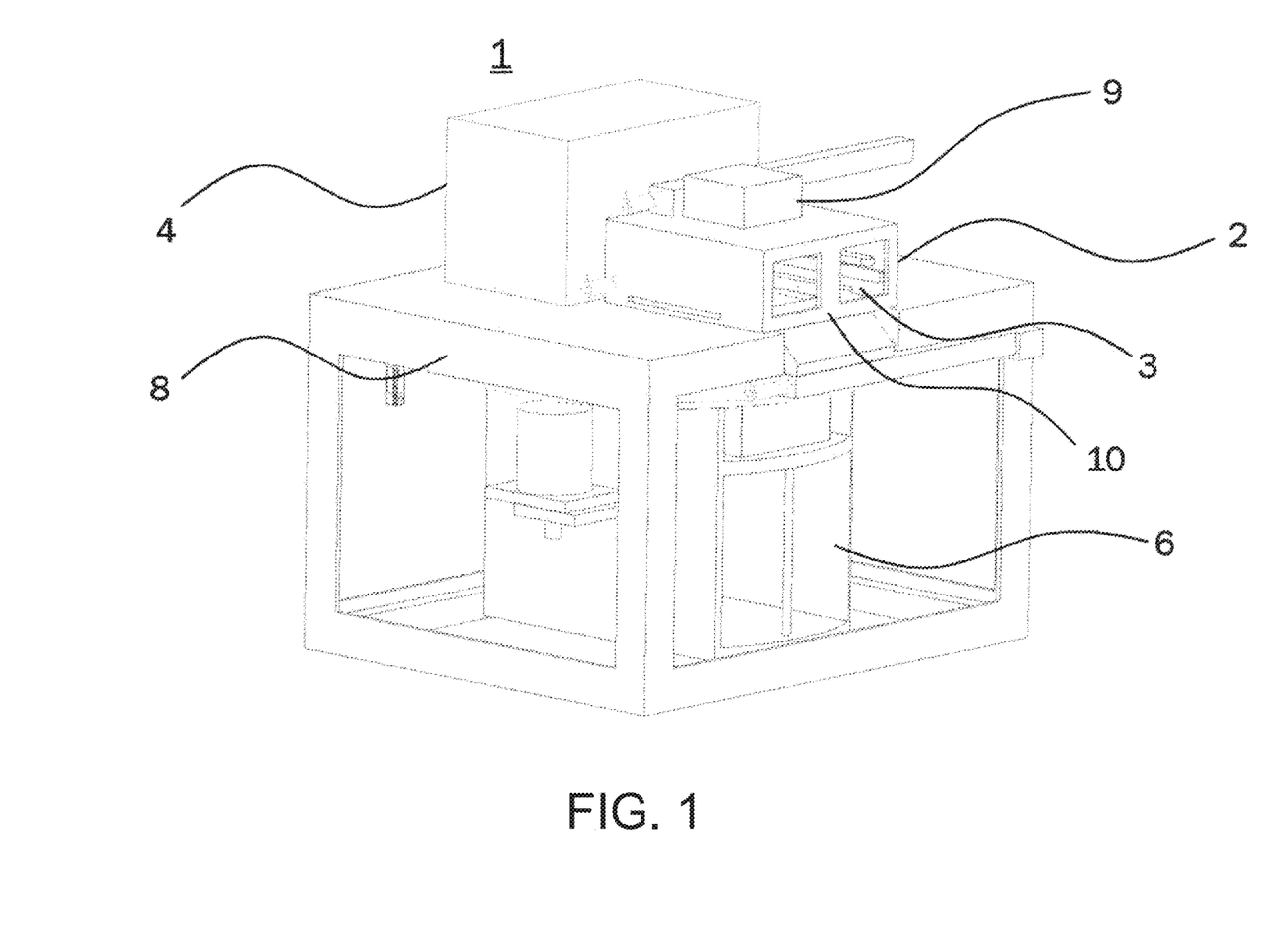
FIG. 1 shows a perspective view of a first embodiment of a laser machine tool according to the invention for manufacturing a shaped body by means of focused laser radiation.

FIG. 1 shows a schematic diagram of a machine 1 for manufacturing a shaped body by spatially-selectively consolidating material powder into contiguous regions by means of laser radiation. The machine 1 comprises a machine frame 8 on which a process chamber 2 enclosing a process space 3 and an unpacking chamber 4 enclosing an unpacking space 5 are arranged. A laser beam source 9 generating a laser beam is arranged on the process chamber 2. In the process chamber 2, a shaped body may be built up layer by layer by spatially-selectively consolidating material powder, in particular by laser melting or laser sintering. The operating principle of laser melting or laser sintering is described in the prior art, for example in WO 98/24574 A1 and DE 19905067 A1.

By means of a suction system, an underpressure may be created in the closable process chamber 2, so that the surroundings of the machine 1 and its users can be protected from contamination by welding smoke or other particles, for example material powder, produced during the manufacture of the shaped body. The process chamber 2 encloses a process space 3 which may be accessible via a process chamber door 10.

The process chamber door 10 may have a locking mechanism which can be actuated depending on the machining process. This may prevent the process chamber door 10 from being opened during an ongoing machining process. Instead of an underpressure, a protective gas atmosphere with overpressure may also be built up in the process chamber 2. Inert gases such as nitrogen or argon may be used for this purpose. For this, the process chamber 2 is closable in a substantially gas-tight manner.

In generic machines for laser melting, the process chamber generally has access openings which allow a user to reach into the process space 3 by means of sealed gloves. Reaching into the process space 3 by means of sealed gloves is performed in particular when a finished shaped piece is unpacked. The machine 1 shown in FIG. 1, however, has no access openings, but only two viewing windows. According to the invention, the process step of unpacking is carried out in the unpacking chamber 4. For this purpose, as will be described in more detail below, the building cylinder with the finished shaped piece is transferred into the unpacking chamber 4 for unpacking.

The machine 1 may furthermore comprise a powder recycling device which, however, is not shown in FIG. 1. By means of the powder recycling device, non-consolidated material powder may be recycled for reuse after the manufacturing process. For this purpose, the powder recycling device may be operatively connected to the unpacking chamber, in particular by means of a material powder suction device. The powder preparation device may have an exchangeable storage container for material powder.

A transporting device 6 is arranged in the machine frame 8 below the process chamber 2 and the unpacking chamber 4. The transporting device 6 serves to convey a building cylinder 11, 12 from an operating position in the process chamber 2 to an unpacking position in the unpacking chamber 4 or vice versa. The mode of operation of the transporting device 6 is described in more detail below with reference to FIGS. 2a and 2b.

Figure 2A:
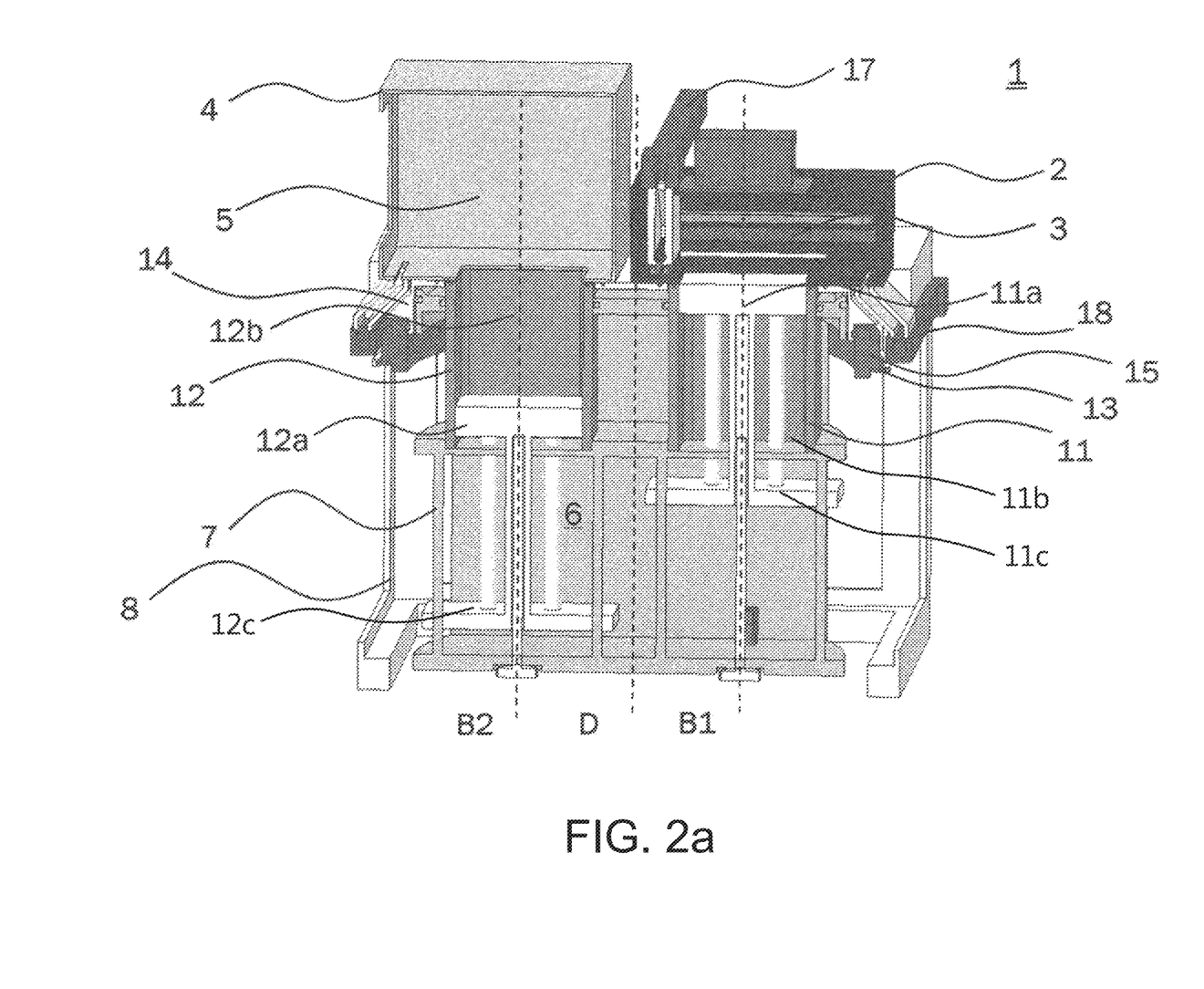
FIG. 2a shows a sectional view through the axes of symmetry of the building cylinders and the axis of rotation of a transporting device of a laser machine tool according to a first exemplary embodiment.

FIG. 2a shows a sectional view of a first exemplary embodiment of a transporting device 6 according to the invention as it can be used in a machine 1 according to the invention. The section passes through an axis of rotation D of the transporting device 6 and through axes of symmetry B1 and B2 of the building cylinders 11, 12. FIG. 2a also shows a powder feed 17 to the process space 3 and a powder return 18 from the process chamber 2 and the unpacking chamber 4, respectively. The powder return 18 may be connected to a powder recycling device which recycles the returned material powder.

Figure 2B:
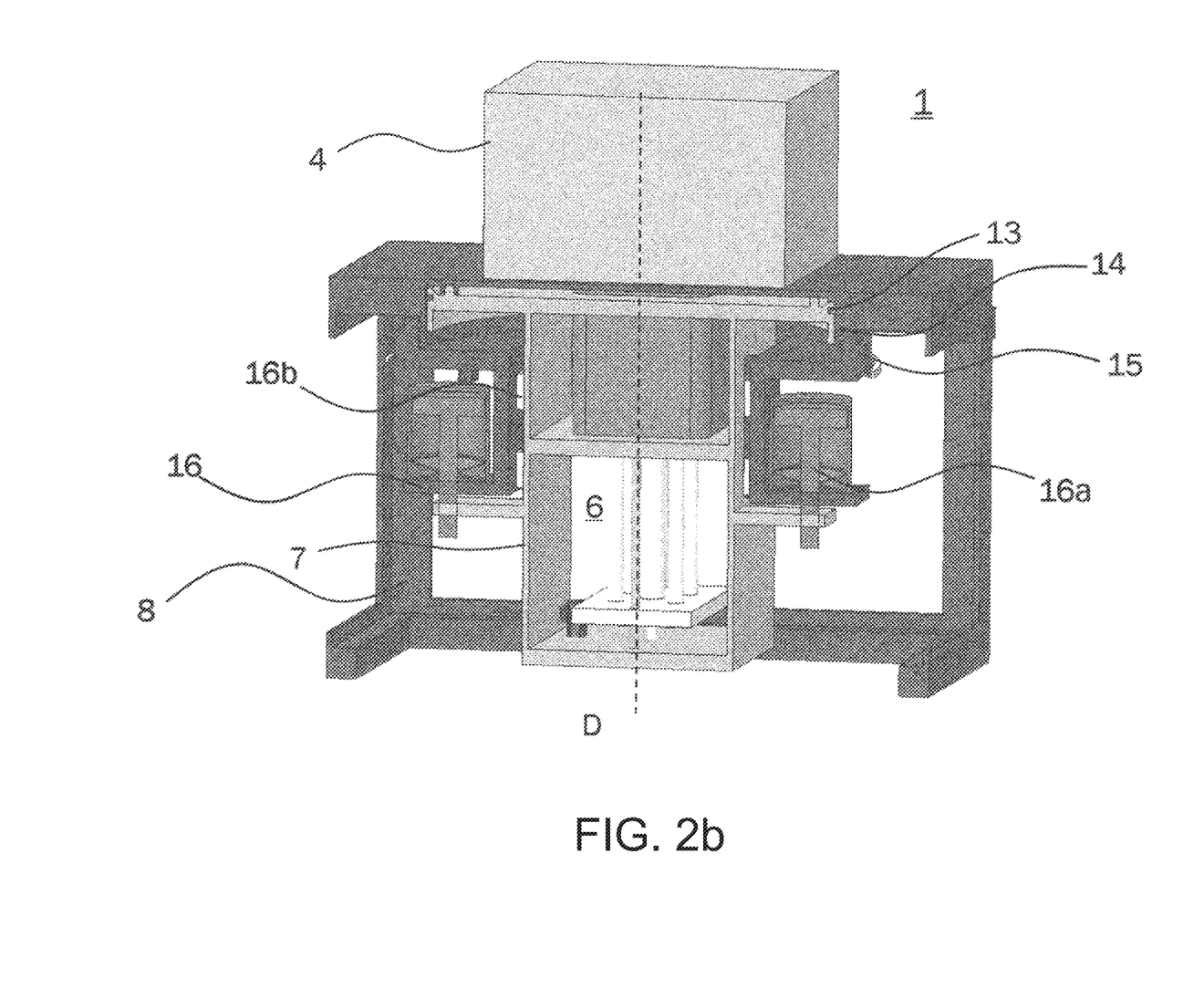

FIG. 2b shows a sectional view perpendicular to the section in FIG. 2a. The axis of rotation D lies in the section plane. The lifting device 16 comprises two spring lifting cylinders 16a which are arranged offset by 90 degrees about the axis of rotation D with respect to the building cylinders 11, 12. The lifting device 16 configured in this way allows the carrier 7 of the transporting device to be raised and lowered evenly relative to the machine frame 8. A plurality of linear guides 16b arranged between the carrier 7 and the lifting device 16 guide the lifting movement of the carrier 7 generated by the lifting cylinders 16a.

The transporting device 6 comprises a carrier 7 on which a first building cylinder 11 and a second building cylinder 12 are arranged. Here, the carrier 7 is configured as a scaffold-like body with several levels and allows for a precise mechanical arrangement of the components, in particular the building cylinders 11, 12. A rotating unit 15 is arranged circumferentially around the carrier 7 and allows for smooth and reliable rotation of the carrier 7. The rotational drive may be operatively connected to the rotating unit 15 in order to cause the carrier 7 to rotate. The rotating unit 15 may be mounted via a rotary bearing with respect to the stationary machine frame 8. The arrangement of the lifting device 16 on (almost) the same level as the building cylinders 11, 12 also results in a uniform distribution of the mass of the transporting device 6. Thus, low mechanical stress on the rotary bearings of the rotating unit 15 can be achieved.

The building cylinders 11, 12 each enclose a building space 11b, 12b. A workpiece table 11a, 12a is arranged in each of the building cylinders 11, 12 and is displaceable into the building space 11b, 12b. To lower or raise the workpiece table 11a, 12a in the building space 11b, 12b, the building cylinders 11, 12 each have a lifting device 11c, 12c. The lifting devices 11c, 12c may, for example, include a hydraulic drive or a ball screw drive. In the first exemplary embodiment shown in FIGS. 2a and 2b, the lifting devices 11c and 12c are arranged on a central plane of the carrier 7.

In the illustration of FIGS. 2a and 2b, the first building cylinder 11 is arranged at an operating position in the process chamber 2. The second building cylinder 12 is arranged at an unpacking position in the unpacking chamber 4. The process space 3 and unpacking space 5 are each shown in section in FIG. 2a. In FIG. 2b, the sectional plane extends between the process chamber 2 and the unpacking chamber 4 such that only the rear wall of the unpacking chamber 4 is shown. In the case of the first building cylinder 11, the workpiece table 11a is arranged in an initial position.

First, a layer of material powder may be applied to the workpiece table 11a. For this purpose, the machine includes a device for applying a powder layer which is arranged in the process space 3 and connected to the powder feed 17. After the material powder has been applied, regions of the material powder layer are consolidated by a focused laser beam. The areas correspond to a cross section of the shaped body to be built up. After consolidation, the workpiece table 11a is lowered by the height of a material powder layer into the building space 11b. By repeating the method steps of applying the material powder layer, consolidating regions and lowering the workpiece table 11a, a shaped body can be built up.

At the end of the manufacturing process, the shaped body, surrounded by non-consolidated material powder, is located in the building space 11b of the first building cylinder 11.

Then, the position of the workpiece table 11a corresponds to the position of the second building cylinder 12 shown in FIGS. 2a and 2b. For unpacking the shaped body, the first building cylinder 11 is transferred into the unpacking chamber 4 by means of the transporting device 6.

In order to transfer the first building cylinder 11 into the unpacking chamber 4, the carrier 7 on which the building cylinders 11, 12 are arranged is first lowered by means of a lifting device 16. The lifting device 16 may, for example, be configured to carry out a stroke of a few millimeters to several centimeters. After the carrier 7 has been lowered, the carrier 7 is rotated by 180 degrees. For this purpose, the transporting device 6 has an axis of rotation D about which rotation is effected by the rotating unit 15. The carrier 7 is rotatably mounted about the axis of rotation D. The axis of rotation D is parallel to the axes of symmetry B1, B2 of the building cylinders 11, 12. After the rotation, the carrier 7 is raised again by the lifting device 16 such that the building cylinders 11, 12 are again flush with the openings provided therefor in the process room 3 and in the unpacking room 5. Thus, the transporting device may simultaneously transfer the first building cylinder 11 from the operating position into the unpacking position and the second building cylinder 12 from the unpacking position into the operating position.

Because the machine 1 according to the invention has an unpacking space 5 that is separate from the process space 3, a finished shaped body can be unpacked while a further production process is already being carried out in the process chamber 2. Since the unpacking process may take many hours, a significant productivity increase of such a machine can be achieved compared to a machine without a separate unpacking position. In addition, the processing space 3 may be dimensioned significantly smaller, as a result of which a smaller laser focal length may be sufficient, so that less complex optics can be used for the laser. A smaller process space 3 can also allow for an improved gas flow in the process space 3. The gas flow includes, on the one hand, the removal of harmful welding fumes and the supply of protective gas such as nitrogen or argon.

The surroundings of the transporting device 6 itself are not sealed off from the outside air. Nevertheless, there should be no contact of the building spaces 11b, 12b, the process space 3 or the unpacking space 5 with the outside air during the transfer. In order to ensure this, the transporting device 6 includes a seal 13 and a lateral guide 14 operatively connected to the seal, which together ensure that the building spaces 11b, 12b, the process space 3 and the unpacking space 5 are sealed. In the first exemplary embodiment, the guide 14 is configured as a circular flange arranged on a bottom side of a surface that closes off the process space 3 and the unpacking space 5 at the bottom. The seal 13 is slidably supported by the guide 14. For this purpose, the seal 13 may have a teflon sliding bearing, for example. The circular guide 14 allows for the carrier 7 to be rotated by 360 degrees.

The workpiece tables 11a, 12a are preferably sealed off from an inner wall of the building cylinders 11, 12 by means of seals. This may prevent material powder or protective gas from escaping to the outside or air or prevent contamination from the outside from entering into the building spaces 11b, 12b.

Even if this is not shown in the figures, it is to be understood that the machine 1 includes a control device configured to control the machine 1. In particular, the control device controls the device for applying the powder layer, the powder recycling, the transporting device 6 and the lifting devices 11c, 12c.

In the first embodiment, the two building cylinders 11, 12 have a circular cross-section and thus each have circular workpiece tables 11a, 12a. In alternative embodiments, the cross section may also be rectangular, in particular square, polygonal, oval, elliptical or also shaped asymmetrically. It is to be understood that the dimensions of the building space 11b, 12b determine the maximum size of the shaped body to be manufactured. Typical dimensions of a building space are a few hundred millimeters in diameter or in height.

In the transporting device 6 shown in FIGS. 2a and 2b, the rotary unit 15 has a circumferential rotary bearing. A rotation of the carrier 7 may be effected by means of a rotational drive. The rotating unit 15 and the carrier 7 may be fixedly connected to one another.

The carrier 7 itself is configured as a body which serves as a supporting frame, in particular for the building cylinders 11, 12 and the lifting device 16. The lifting device 16 is arranged on the carrier 7 at approximately the same level as the building cylinders 11, 12 and offset with respect thereto. With this arrangement of the rotating unit 15 and the lifting device 16, the working height of the machine 1 can be reduced so that the machine 1 is easier to operate. It is crucial for the function of the transporting device 6 that the rotation about the axis D, the lifting of the tool tables 11a, 12a of the two building cylinders 11, 12 and the lifting by the lifting device 16 can be carried out independently of one another.

Figure 3A:
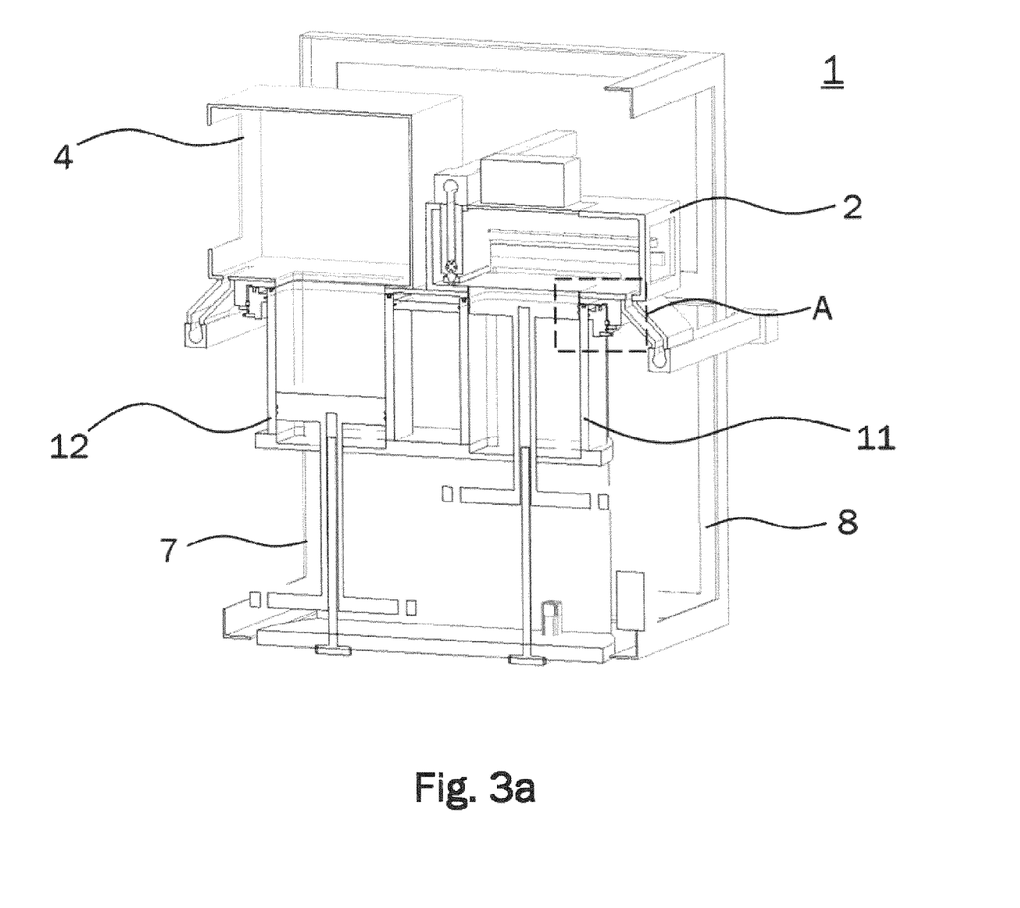
FIG. 3a shows a sectional view of a laser machine tool according to a second exemplary embodiment.
Figure 3B:
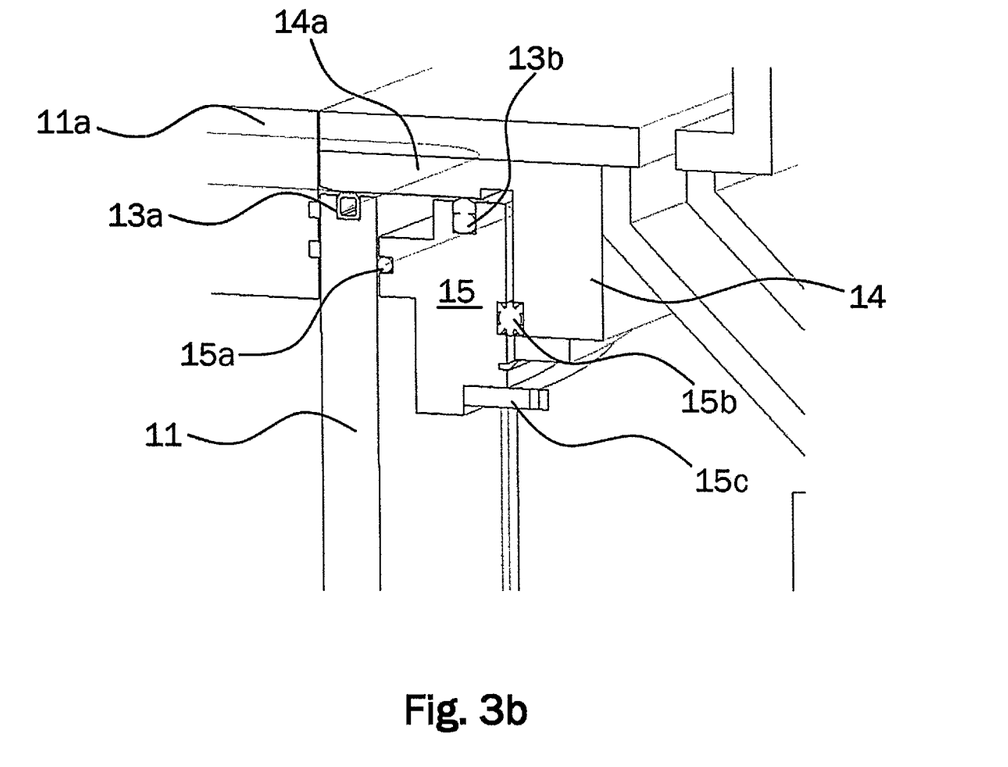
FIG. 3b shows a detailed view of the second exemplary embodiment.

A second exemplary embodiment, a modification of the first embodiment, is shown in FIGS. 3a and 3b. The main components of the machine 1 according to the second exemplary embodiment substantially correspond to those of the machine 1 according to the first exemplary embodiment. A repeated description of all reference symbols and a repeated description of the identical components are therefore omitted.

The difference between the second embodiment and the first embodiment is substantially that a lifting movement is dispensable when the first building cylinder 11 is transferred from the operating position to the unpacking position and the second building cylinder 12 is simultaneously transferred from the unpacking position to the operating position. This is achieved by arranging a seal 13a between the building cylinders 11, 12 and the process chamber 2 or between the building cylinders 11, 12 and the unpacking chamber 4, which seal can be opened and closed. A preferred embodiment of the closable seal 13a is an inflatable seal 13a which can be closed by applying compressed air. In order to open the inflatable seal 13a, the compressed air can be discharged in a controlled manner. For this purpose, the seal 13a may comprise a controllable valve, for example.

FIG. 3b shows a detailed view of the region identified by the rectangle A drawn in dashed lines in FIG. 3a. A part of the first workpiece table 11a of the first building cylinder can be seen on the left edge of FIG. 3b. In contrast to the first exemplary embodiment, the wall of the building cylinder 11 is shorter than the travel path of the tool table 11a so that the first workpiece table 11a protrudes from the building cylinder 11 and is flush with the bottom of the process chamber 2 in the operating position shown in FIG. 3b. The inflatable seal 13a, which can be operated by compressed air, is arranged on the upper edge of the building cylinder 11 such that the seal 13a seals the building cylinder 11 substantially gas-tightly by pressure against a sealing surface 14a of the guide 14. The second building cylinder 12 is also sealed in the same way. An inflatable seal 13a is arranged circumferentially along the upper edge of the building cylinders 11, 12 such that the building spaces 11b, 12b can each be sealed in order to provide a space sealed from the outside with the process space 3 or with the unpacking space 5.

A building cylinder exchange between the operating position and the unpacking position can be achieved by first discharging the compressed air from the inflatable seal 13a. This reduces the volume of the inflatable seal 13a such that the contact between the seal 13a and the sealing surface 14a is interrupted. The compressed air may be discharged, for example, via a controllable valve (not shown).

Subsequently, the building cylinders 11, 12 or the entire carrier 7 may be rotated by 180 degrees about the axis of rotation, similar to the first exemplary embodiment. A lifting operation of the transporting device 6 before and/or after the rotation is no longer required. The machine 1 of the second exemplary embodiment therefore does not require a lifting device 16 and the transfer process is less complex and can be carried out in a time-saving manner.

As can be seen from FIG. 3b, it may only be required to lower the tool tables 11a and 12a to below the upper edge of the building cylinders 11, 12 in order to allow for the rotation. This upper edge is at a small distance from the lower edge of the sealing surface 14a shown in detail in FIG. 3b. After the rotation has been carried out, the inflatable seal 13a is again operated with compressed air in order to seal the building cylinders 11, 12 again.

During the process of rotation, the inflatable seal 13a is substantially open. In order to avoid an exchange of air or gas with the environment, a sliding seal 13b may also be provided between the rotating unit 15 and the sealing surface 14a. This sliding seal 13b is made of a suitable material which ensures sufficient tightness of the seal 13b even in the event of a rotational movement.

In the second exemplary embodiment, the rotating unit 15 may be fixedly connected to the building cylinders 11, 12. The rotating unit 15 is sealed against the building cylinders 11, 12 or against the carrier 7 by means of a further seal, for example an O-ring 15a extending around the circumference. The circumferential seal 15a may further improve the effect of the inflatable seal 13a and the sliding seal 13b.

As shown in FIG. 3b, the rotating unit 15 is mounted by means of a circumferentially arranged rotary bearing 15b with respect to the guide 14. For example, a roller bearing, in particular a wire roller bearing, may be used as the rotary bearing 15b. This allows particularly easy movement, high dynamics and a compact design to be combined.

The rotating unit 15 shown in detail in FIG. 3b also has a circumferentially extending annular projection 15c serving as a mechanical interface for a rotational drive not shown in the figures. The rotational drive may cause a rotation of the entire carrier 7 and thus the building cylinders 11 and 12.

The features disclosed in the above description, the claims and the drawings may be significant, both individually and in any combination, for the implementation of the invention in its various configurations.

LIST OF REFERENCE SYMBOLS

1 Laser machine tool
2 Process chamber
3 Process space
4 Unpacking chamber
5 Unpacking space
6 Transporting device
7 Carrier of the transporting device
8 Machine frame
9 Laser beam source
10 Process chamber door
11 First building cylinder
11a First workpiece table
11b First building space
12 Second building cylinder
12a Second workpiece table
12b Second building space
13 Seal
13a Inflatable seal
13b Sliding seal
14 Guide
14a Sealing surface
15 Rotating unit
15a O-ring
15b Rotary bearing
15c Annular projection
16 Lifting device
16a Spring lifting cylinder
16b Linear guide
17 Powder feed
18 Powder return
D Axis of rotation
B1 Axis of symmetry axis of the first building cylinder
B2 Axis of symmetry axis of the second building cylinder

The invention claimed is:

1. A machine for manufacturing shaped objects layer by layer by spatially-selectively consolidating material powder into contiguous regions by means of electromagnetic radiation, the machine comprising:
a process chamber enclosing a process space;
an unpacking chamber enclosing an unpacking space;
a first building cylinder including a first workpiece table for the material powder and a first building space, the first workpiece table being displaceable into the first building space;
a second building cylinder including a second workpiece table for the material powder and a second building space, the second workpiece table being displaceable into the second building space;
a transporting device configured to respectively transfer the first building cylinder and the second building cylinder between an operating position in the process space and an unpacking position in the unpacking space, the transporting device being a rotatable body,
an inflatable seal arranged circumferentially at an upper edge of each of the first building cylinder and the second building cylinder, each inflatable seal being configured to be operated by compressed air to seal each building cylinder substantially gas-tightly by pressure against a sealing surface of a guide;
a rotating unit configured to rotate the transporting device to transfer the first and second building cylinders between the operating position and the unpacking position; and
a sliding seal sealing between the rotating unit and the sealing surface of the guide, wherein:
the transporting device is configured to transfer the first building cylinder from the operating position into the unpacking position and the second building cylinder from the unpacking position into the operating position simultaneously,
when the first building cylinder or the second building cylinder is in the operating position, the respective building space of the first building cylinder or the second building cylinder is substantially gas-tightly connected to the process chamber,
when the first building cylinder or the second building cylinder is in the unpacking position, the respective building space of the first building cylinder or the second building cylinder is substantially gas-tightly connected to the unpacking chamber, each inflatable seal is configured to discharge the compressed air before the simultaneous transfer of the first building cylinder and the second building cylinder between the operating position and the unpacking position, and the rotating unit is positioned entirely radially outward of the first building cylinder relative to an axis of rotation of the transporting device.

2. The machine according to claim 1, wherein the first building cylinder and the second building cylinder are arranged on a carrier of the transporting device, the carrier having the same axis of rotation as the axis of rotation of the transporting device, which is oriented in parallel to an axis of symmetry of the first building cylinder and an axis of symmetry of the second building cylinder.

3. The machine according to claim 2, wherein the carrier of the transporting device is displaceable in parallel to the axis of rotation of the transporting device.

4. The machine according to claim 1, wherein the first building space, the second building space, the process space, and the unpacking space are each substantially gas-tightly closed when transferring the first and second building cylinders between the operating position and the unpacking position.

5. The machine according to claim 1, wherein the process chamber and the unpacking chamber include gas supply lines configured to create a protective gas atmosphere.

6. The machine according to claim 1, wherein the process chamber or the unpacking chamber includes a suction system configured to create an underpressure.

7. The machine according to claim 1, wherein the unpacking chamber includes a suction system with a filter configured to recover or recycle non-consolidated material powder.

8. A method for manufacturing a shaped body, the method comprising:
connecting a first building space of a first building cylinder to a process space;
applying a material powder layer to a workpiece table arranged in the first building space;
spatially-selectively consolidating regions of the material powder layer by means of electromagnetic radiation;
lowering the workpiece table by a thickness of the material powder layer into the first building space;
repeating the steps of applying, consolidating, and lowering until the shaped body is formed;
performing a translational movement to remove the first building cylinder from the process space;
performing a rotational movement of the first building cylinder about an axis of rotation parallel to an axis of symmetry of the first building cylinder;
performing a translational movement to connect the first building space to an unpacking space;
removing and recycling non-consolidated material powder; and
removing a finished shaped body from the first building cylinder, wherein:
while the first building cylinder is being transferred from the process space to the unpacking space, a second building cylinder with a second building space is transferred simultaneously from the unpacking space to the process space so that, while the shaped body is being unpacked from the first building cylinder, a further manufacturing process is carried out in the second building cylinder,
when the first building cylinder or the second building cylinder is in an operating position, the respective building space of the first building cylinder or the second building cylinder is substantially gas-tightly connected to a process chamber,
when the first building cylinder or the second building cylinder is in an unpacking position, the respective building space of the first building cylinder or the second building cylinder is substantially gas-tightly connected to an unpacking chamber,
the first building cylinder and the second building cylinder each include an inflatable seal arranged circumferentially at an upper edge of each of the first building cylinder and the second building cylinder,
each inflatable seal is configured to be operated by compressed air to seal each building cylinder substantially gas-tightly by pressure against a sealing surface of a guide,
each inflatable seal is configured to discharge the compressed air before the simultaneous transfer of the first building cylinder and the second building cylinder between the operating position and the unpacking position,
a rotating unit is configured to perform the rotational movement to rotate a transporting device to transfer the first and second building cylinders between the operating position and the unpacking position,
a sliding seal seals between the rotating unit and the sealing surface of the guide, and
the rotating unit is positioned entirely radially outward of the first building cylinder relative to the axis of rotation of the transporting device.

9. The method according to claim 8, wherein the step of transferring includes a rotation of the first building cylinder and the second building cylinder about the axis of rotation of the transporting device which is oriented in parallel to the axis of symmetry of the first building cylinder and an axis of symmetry of the second building cylinder.

10. The machine according to claim 1, further comprising an O-ring extending along an inner circumference of the rotating unit, the O-ring being positioned radially outward of each inflatable seal and radially inward of the sliding seal, relative to the axis of rotation of the transporting device, and
a bearing between a circumferentially outer surface of the rotating unit and a circumferentially inner surface of the guide, the bearing being radially outward of the sliding seal.

* * * * *